Figure 2:
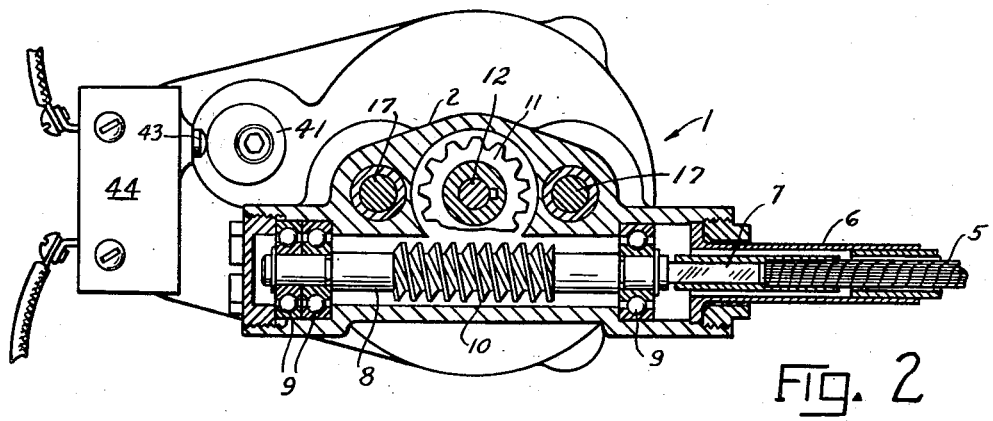

July 15, 1952

C. R. SACCHINI 2,603,105

CRANK THROW ADJUSTMENT FOR MOTION CONVERTER
MECHANISMS AND THE LIKE

Original Filed Jan. 27, 1949

Inventor
COLUMBUS R. SACCHINI

By
George M Soule
Attorney

Patented July 15, 1952

2,603,105

UNITED STATES PATENT OFFICE 2,603,105

CRANK THROW ADJUSTMENT FOR MOTION CONVERTER MECHANISMS AND THE LIKE

Columbus R. Sacchini, Willoughby, Ohio, assignor to The Marquette Metal Products Company, Cleveland, Ohio, a corporation of Ohio Continuation of application Serial No. 73,142, January 27, 1949. This application June 18, 1949, Serial No. 100,046

1 Claim. (Cl. 74—600)

The invention relates to a motion converter for an electric-motor-driven windshield wiper, and particularly to a novel adjustable-throw crank construction for a motion converter. The present application is a continuation of my prior application Serial No. 73,142, filed January 27, 1949, now Patent No. 2,560,000.

Most electric-motor-driven windshield wiper units or installations employ reduction gearing between the motor and an oscillating or reciprocating wiper element which latter desirably has essentially harmonic motion. Such motion customarily requires some form of scotch yoke or crank and pitman movement connected to and driven by a unidirectionally rotated part such as the power takeoff wheel of the reduction gearing. An important problem in arrangements of the sort outlined above is to provide a compact and simple crank throw adjustment for operation of the scotch yoke or crank and pitman movement whereby the wiper stroke can be fixedly set at different amplitudes depending on the shape and area of the surface to be wiped. Many devices to adjust crank throw are known but all those with which I am familiar are subject to one or more disadvantages, examples being complexity and excessive cost; lack of axial compactness; difficulty of effecting adjustments; likelihood of looseness due to wear of critical parts; uncertainty of maintenance of the selected adjustments, and lack of desired or necessary torque transmitting strength particularly when the mechanism served is of small size. Subject invention overcomes those disadvantages—indicating the principal objects hereof.

A specific object is to provide a compact crank throw adjustment device for mechanisms such as outlined above, wherein a large number of adjustments of small and approximately equal increments are obtainable and wherein the necessary parts can be quickly and positively locked in place without dependence on friction as when a clamping screw or series of screws is or are used to maintain adjustment.

A more specific object is to provide an improved adjustable connection between a crank member (e. g. crank pin) and a rotary operating support for the crank member, which connection enables selection of a large number of throw adjustments and is rendered effective to maintain the selected adjustment simply by enclosing the crank member and rotary support assembly in working position within a suitable housing having separable parts adapted to be secured conventionally to each other—which is to indicate that no special fastening device has to be used between the crank member and its rotary support.

Figure 1:
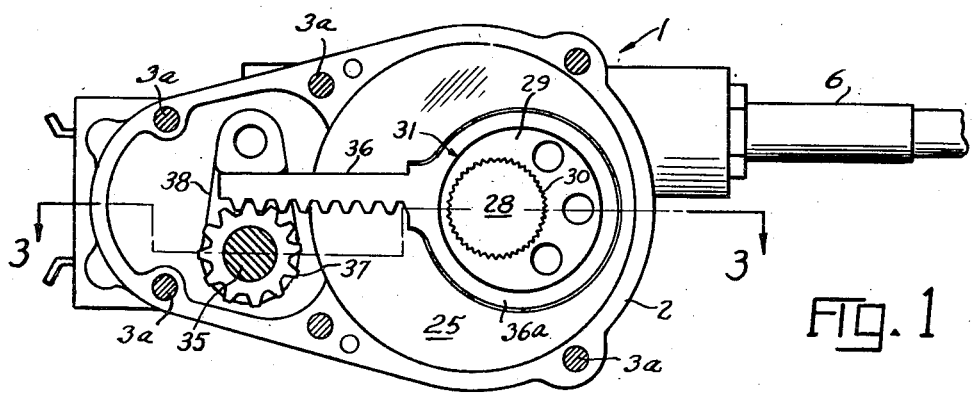
Figure 3:
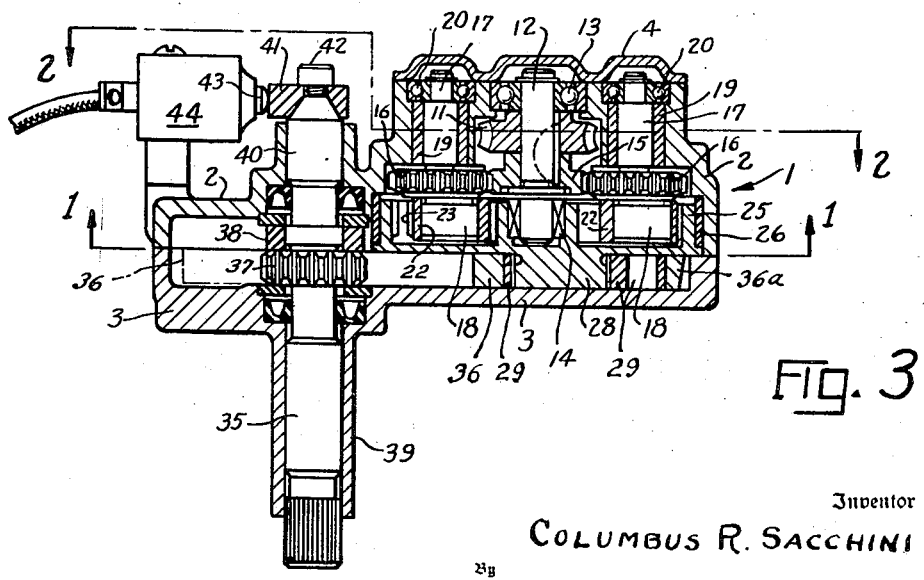

Other objects and features of the invention will become apparent from the following description of the two illustrative forms shown in the drawings wherein:

Fig. 1 is a sectional front elevation of the motion converter hereof, a front cover portion of the mechanism being removed according to line 1—1 of Fig. 3. Fig. 2 is a sectional rear elevation, taken as indicated by line 2—2 on Fig. 3. The latter in a sectional plan view as conventionally indicated on Fig. 1.

Referring to Figs. 1 to 3, the body of the converter mechanism unit 1 comprises a main body section 2 and front and rear cover sections 3 and 4. The cover section 3 forms the principal housing for the adjustable crank throw mechanism and is removably secured to the section 2 by screws indicated at 3a Fig. 1 to fix or maintain the crank adjustment as will be described. Power input to the unit from a suitable electric motor may be through a flexible drive shaft 5 entering a tubular adapter 6 secured as clearly shown in Fig. 2, the shaft being coupled as at 7 with a worm shaft 8 supported in anti-friction bearings 9. The worm 10 on the shaft 8 meshes with a complementary worm wheel 11, Figs. 2 and 3, on a transverse shaft 12 supported on bearings 13 and 14 within the section 2. Bearing 14 is in a drive wheel 28 described later. The worm drive affords a 5:1 reduction to shaft 12.

The principal speed reduction of the unit 1 is through a gyratory internal-external gear system which is essentially the same as that of U. S. Patent 72,792 to Arthur W. Browne. The worm wheel 11 and a central driving gear 15 of said system have a common key connection with shaft 12, the gear 15 constantly meshing with identical gears 16 rigid with respective crank-operating shafts 17 having parallel cylindrical crank or cam heads 18 projecting from the shafts and eccentrically of their respective axes which are fixed by supporting radial and axial thrust bearings 19 and 20 respectively in the body section 2.

The crank or cam heads 18 fit complementary openings in a gyratory externally toothed eccentric gear member 22 which is non-rotatably supported by the eccentric heads 18. Gear 22 has a full complement of external gear teeth 23. Said teeth mesh continually at one peripheral region only with internal teeth of an output or rotary power takeoff or drive wheel 25 of the gearing. The drive wheel 25 is maintained on a fixed axis in the casing concentric with the drive shaft 12 by a surrounding bearing sleeve 26. The gyrating gear 22 uniformly advances the wheel 25 at a relatively slow rate as determined by the difference in the number of teeth on part of the gyratory gear and wheel 25 (6 in the illustrated form, affording a reduction of 105:6).

The crank pin of the drive wheel 25, best shown by Fig. 1, is formed by a peripherally serrated circular stub 28 of the drive wheel eccentric to the drive wheel axis and a circular crank pin element 29 surrounding the stub 28 and internally serrated to mate the serrations of the stub as at 30. One series of serrations must form a complete annulus. Both are preferably complete for maximum torque carrying strength and economy of manufacture. The crank pin element 29 has an external circular crank-forming surface 31 which is eccentric to the axis of the serrated opening. Removal of the crank element 29 from its supporting serrations 30 (permitted by removal of casing section 3) and replacement of said element 29 on the serrations in selected turned positions about the axis of stub 28 enables adjustment of crank throw in small increments (e. g.) from zero to the maximum throw position illustrated.

A zero throw position of the crank element 29 is not actually used in practice but is provided for (by making the distance by which the disc 29 is eccentric to the serrated opening 30 the same as that by which the stub 28 is eccentric to the drive wheel 25) in event an extremely small angular wiper travel is required. The eccentric distances mentioned may of course be dissimilar.

The regular saw-tooth shape of the serration teeth illustrated in the two exemplary forms of crank-throw-adjusting mechanism hereof is mainly by way of example, being of more or less standard form from the standpoint of manufacture.

The revolving motion of the crank pin element 29 is transmitted to an oscillatory power takeoff or output shaft 35 by a pitman rod 36 having a circular strap portion 36a embracing pin element 29. The rod 36 has teeth held by a freely rocking yoke 38 pivotally supported on the shaft 35, permanently in mesh with teeth of a gear 37 fast on said shaft. One end of the shaft 35 extends through a bearing portion 39 of the cover section 3 to support the wiper drive arm (not shown). The opposite projecting end portion 40 of the shaft 35 (for parking purposes as explained in application Serial No. 73,142) has an eccentric cam 41 adjustably fixed thereto as by a screw 42. The cam 41 functions through an actuator 43 of switch 44 once for each cycle of operation of the shaft 35 to close an electrical parking control circuit not shown.

As shown particularly by Fig. 3 the casing section 3 is made hollow so as to shroud the various parts of the crank mechanism, pitman 36 and yoke 38 when attached to section 2; and concomitantly to expose those parts for ease of manipulation thereof as required for crank throw adjustment when the section 3 is removed. The yoke 38, as made apparent in Fig. 1, overhangs the rack portion of the pitman 36 from one side only, whereby, when casing section 3 is removed, the pitman can be easily slid off the crank pin element 29 and out of engagement with the teeth of pinion 37.

I claim:

In combination a rotary drive member having a disc portion, a casing section containing the member, and having a shoulder preventing axial movement of the member in one direction, said section having means providing a supporting journal for the member, a generally circular stub projecting from the disc portion of the drive member eccentric to the journal axis and having a circular series of uniformly spaced external serrations, a crank-pin-forming member of circular form having an eccentric generally circular opening formed by internal serrations mating those of the stub in various turned positions about the axis of the stub to provide an adjustable length crank, an output member engaged by the external peripheral surface of the crank-pin-forming member, and a second casing section of hollow form in shrouding relation to the crank and output member assembly, said second section complementing the first mentioned section and detachably secured thereto, the second section, when in attached position, providing a shoulder holding the crank-pin-forming member and output member in position on the serrated stub and crank-pin-forming member respectively and approximately against the disc portion of the drive member.

COLUMBUS R. SACCHINI.

REFERENCES CITED

The following references are of record in the file of this patent:

UNITED STATES PATENTS

| Number | Name | Date |
| --- | --- | --- |
| 447,386 | Vuillier | Mar. 3, 1891 |
| 2,074,708 | Smith | Mar. 23, 1937 |
| 2,454,881 | Michelman | Nov. 30, 1948 |
| 2,506,562 | Wait | May 2, 1950 |